US012115132B1

(12) United States Patent
Blatter

(10) Patent No.: US 12,115,132 B1
(45) Date of Patent: Oct. 15, 2024

(54) PILL DISPENSER FOR STORING AND DISPENSING PILLS

(71) Applicant: Yaakov Blatter, Thiells, NY (US)

(72) Inventor: Yaakov Blatter, Thiells, NY (US)

( * ) Notice: Subject to any disclaimer, the term of this patent is extended or adjusted under 35 U.S.C. 154(b) by 0 days.

(21) Appl. No.: 18/428,182

(22) Filed: Jan. 31, 2024

(51) Int. Cl.

| | |
|---|---|
| ***A61J 7/00*** | (2006.01) |
| ***A61J 1/03*** | (2023.01) |
| ***B65D 83/04*** | (2006.01) |

(52) U.S. Cl.
CPC ............... *A61J 7/0076* (2013.01); *A61J 1/03* (2013.01); *B65D 83/0409* (2013.01); *B65D 2583/0477* (2013.01)

(58) Field of Classification Search
CPC ....... A61J 7/0076; A61J 1/03; B65D 83/0409; B65D 2583/0477
USPC .......................................................... 221/298
See application file for complete search history.

(56) References Cited

U.S. PATENT DOCUMENTS

| | | | | | |
|---|---|---|---|---|---|
| 825,078 | A * | 7/1906 | Schoen | G07F 11/44 | 221/290 |
| 1,449,864 | A * | 3/1923 | Lillis | G07F 11/44 | 221/281 |
| 2,134,180 | A * | 10/1938 | Felber | B65D 83/0409 | 221/266 |
| 2,683,554 | A * | 7/1954 | Mulhauser, Jr. | B65D 83/0409 | 221/152 |
| 3,327,897 | A * | 6/1967 | Weitzman | G07F 11/44 | 221/265 |
| 3,885,703 | A * | 5/1975 | Neavin | B65D 83/0409 | 221/202 |
| 4,415,098 | A | 11/1983 | Haas | | |
| 4,428,502 | A * | 1/1984 | Veltri | B65D 83/0409 | 221/196 |
| 4,611,727 | A * | 9/1986 | Graff | B65D 83/0409 | 221/265 |

(Continued)

FOREIGN PATENT DOCUMENTS

| | | | |
|---|---|---|---|
| CN | 108033147 | B | 8/2019 |
| DE | 102011112953 | A1 | 3/2013 |

(Continued)

OTHER PUBLICATIONS

Dr. Yi Ren, et al., "Smart Pill Dispenser" MAE 540—Advanced Product Design Methodology.

(Continued)

*Primary Examiner* — Rakesh Kumar

(57) ABSTRACT

A pill dispenser for storing and dispensing pills is disclosed. The pill dispenser includes a container and a funnel inserted in the container. The pill dispenser includes a tunnel having a tunnel channel. The tunnel inserts in the funnel. The pill dispenser includes a base connecting the funnel. The base has a pill discharging hole and a slot opening. The pill dispenser includes a stick member, and a drawer having a drawer channel. The base receives the drawer through the slot opening, and the drawer connects to the stick member. The container stores pills and the funnel receives the pills. The tunnel rotates to stir the pills such that a pill falls through the tunnel channel. The tunnel channel aligns with the drawer channel and positions the pill in the drawer channel. The drawer presses into the base causing the drawer channel to align with the pill discharging hole to discharge the pill via the pill discharging hole.

20 Claims, 12 Drawing Sheets

(56) References Cited

U.S. PATENT DOCUMENTS

| | | | | | |
|---|---|---|---|---|---|
| 4,848,593 | A * | 7/1989 | Jeandaud | B65D 83/049 221/256 |
| 5,219,095 | A * | 6/1993 | Shimizu | G07F 17/0092 221/265 |
| 5,791,515 | A * | 8/1998 | Khan | B65D 83/0409 221/265 |
| 6,131,765 | A * | 10/2000 | Barry | A61J 7/0076 221/268 |
| 6,763,971 | B1 * | 7/2004 | Tong | G07F 11/44 221/151 |
| 6,849,457 | B1 * | 2/2005 | Babson | B01L 3/0289 422/562 |
| 7,128,240 | B1 * | 10/2006 | Oesch | B65D 83/0409 221/298 |
| 9,045,272 | B2 * | 6/2015 | Kim | B65D 83/0409 |
| 9,150,346 | B1 * | 10/2015 | Aramian | A61J 7/04 |
| 9,501,890 | B2 * | 11/2016 | Rudek | G07F 17/0092 |
| 9,775,746 | B2 * | 10/2017 | Pellerin | G07F 11/44 |
| 10,004,664 | B2 | 6/2018 | Aldasouqi et al. | |
| 10,392,181 | B2 * | 8/2019 | Zonana | B65D 83/0409 |
| 10,420,708 | B2 * | 9/2019 | Arric | A61J 7/0463 |
| 11,091,312 | B2 * | 8/2021 | Tojo | B65D 83/04 |
| 11,311,458 | B2 * | 4/2022 | Panick | A61J 1/2055 |
| 11,335,448 | B2 * | 5/2022 | Arric | G16H 40/63 |
| 11,376,197 | B2 | 7/2022 | González Bueno et al. | |
| 2003/0201277 | A1 * | 10/2003 | Baker | B65D 83/0409 221/266 |
| 2016/0001955 | A1 * | 1/2016 | Wang | B65D 83/0409 221/268 |
| 2018/0161247 | A1 | 6/2018 | Koike et al. | |
| 2022/0105007 | A1 * | 4/2022 | Brown | A61J 1/03 |
| 2023/0181425 | A1 * | 6/2023 | Gilreath | A61J 7/0076 700/244 |

FOREIGN PATENT DOCUMENTS

| | | | | |
|---|---|---|---|---|
| EP | 0287335 | A2 | 10/1988 | |
| EP | 1052189 | A2 | 11/2000 | |
| EP | 3594147 | A1 * | 1/2020 | A61J 1/03 |
| EP | 4082937 | A1 * | 11/2022 | A61J 7/0076 |
| FR | 2928356 | B1 | 1/2012 | |
| KR | 20030040747 | A | 5/2003 | |
| KR | 20060030990 | A | 4/2006 | |
| KR | 100998864 | B1 | 12/2010 | |
| WO | 2010060130 | A1 | 6/2010 | |
| WO | WO-2024015370 | A1 * | 1/2024 | |

OTHER PUBLICATIONS

Jin-Yuan Lin, et al., “An Automatic Chinese Medicine Dispensing Machine Using Shelf-Based Mechanism”, the Journal of applied science, Nov. 23, 2019, vol. 9, Issue 23, Taiwan.

Diaa Salama Abdul Minaam, et.al., “Smart drugs:Improving health-care using Smart Pill Box for Medicine Reminder and Monitoring System”, Future Computing and Informatics Journal, Dec. 2018, pp. 443-456, vol. 3, Issue 2, Egypt.

Alejandro Rdz., “Pill dispenser mechanism”. Available online: https://grabcad.com/library/pill-dispenser-mechanism-1 (accessed on Oct. 28, 2021).

* cited by examiner

PILL DISPENSER FOR STORING AND DISPENSING PILLS

TECHNICAL FIELD

The present disclosure relates to pill dispensers, and in particular, relates to a pill dispenser for storing and dispensing medicine pills or tablets one at a time.

DESCRIPTION OF THE RELATED ART

It is known that a pill dispenser or a tablet dispenser is used to store tablets or pills and deliver a single tablet to a user or patient, who will take the tablet. Most of the pill dispensers are designed to deliver a specific shape of tablets, in which one tablet is separated from a bulk of tablets stored and delivered.

Several pill dispensers have been disclosed in the past. One such pill dispenser is disclosed in an European Publication No. 0,287,335, entitled "Tablet dispenser having feed assist means" ("the '335 Publication"). The '335 Publication discloses a tablet dispenser (10) having a feed channel (32) with a flexible wall (28) to prevent bridging of tablets (20). The flexible wall (28) moves in response to the movement of a tablet dispenser operating mechanism. The movement of the flexible wall (28) agitates the tablets (20) in the feed channel (32) to thereby prevent bridging of the tablets (20).

Another pill dispenser is disclosed in a Great Britain Publication No. 2108086, entitled "Tablet dispenser" ("the '086 Publication"). The '086 Publication discloses a tablet dispenser at the lower end of its storage container having a positioning passage (5), of which the outlet opening can be closed by means of a slider (3). The positioning passage (5) is so dimensioned that there is only sufficient space for tablets to lie upright on their peripheral edge, being only slightly wider than one tablet. A pocket (4) open towards the passage (5) is formed in the lower end of the slider (5). A tablet located in the pocket (4) is dispensed from the tablet dispenser when the slider (3) is moved from its closed position.

Another pill dispenser is disclosed in a United States Granted U.S. Pat. No. 4,653,668, entitled "Medicament dispensing container" ("the '668 Patent"). The '668 Patent discloses a container for storing and dispensing small objects, such as capsules or pills containing medicament, one at a time, consists of a receptacle containing, within itself, a delivery mechanism including a funnel-shaped exit port for capsules and a capsule or pill delivery tube at the end of said funnel-shaped exit designed to accommodate no more than one pill or capsule. This funnel divides the outer receptacle into an upper storage compartment and a lower delivery compartment. The receptacle also contains between the exit end of the receptacle and the delivery tube a resilient gate member positioned to prevent or allow escape of a capsule or pill from the delivery tube. The inner end of the receptacle is pressed into or twisted in the user's hand which moves the resiliently mounted gate members, thus opening the delivery tube and delivering a single small object to the user. The user then releases pressure on the exit end of the receptacle which at the same time releases the resilient gate allowing them to return to the rest position thus preventing the exit of the second small object until the cycle is restarted.

Yet another pill dispenser is disclosed in a United States Granted U.S. Pat. No. 4,230,236, entitled "Tablet dispenser" ("the '236 Patent"). The '236 Patent discloses a container for generally cylindrical tablets which can be used to repeatedly dispense the tablets in predetermined quantities. The dispenser comprises an outer case and a slidably mounted inner part which together define a container, a dispensing gate, and a downward sloping channel connecting one or two ramps situated at the base of the container to the gate. The width of the channel is such as to allow a single column of tablets supported on their peripheries. The inner part is depressable from the exterior to cause relative movement between the gate and the channel from one position where the gate is in register with the channel to a second position where the gate is in register with a dispenser outlet. The relatively simple design of the dispenser enables it to be injection-moulded from plastic material.

Although the above discussed disclosures are useful, they have few problems. For example, some of the existing pill dispensers fail to provide a container capable of dispensing pills individually with a single motion, and simultaneously protect the unused pills from contamination or environment.

Therefore, there is a need in the art to provide an improved pill dispenser for storing, and dispensing pills or tablets with a single action.

SUMMARY

It is an object of the present invention to provide a pill dispenser for storing and dispensing pills that avoids the drawback of known pill dispensers.

It is another object of the present invention to provide a pill dispenser having a unique mechanism to dispense one pill at a time.

It is another object of the present invention to provide a pill dispenser that dispenses a pill with a single action/motion.

In order to achieve one or more objects, the present invention provides a pill dispenser for storing and dispensing pills. The pill dispenser includes a container, and a cap covering the top of the container. The pill dispenser includes a funnel. The funnel inserts in the container. The funnel includes poles extending downward. Further, the funnel includes a tapered section having ribs forming grooves. Furthermore, the funnel includes a funnel channel.

In addition, the pill dispenser includes a tunnel. The tunnel inserts in the funnel. The tunnel includes a tunnel channel. The tunnel channel aligns with the funnel channel. Further, the tunnel includes a pinion at the bottom. The tunnel includes a stirrer positioned at the grooves. The pill dispenser includes a base. The base includes pole receivers. Further, the base includes a pill discharging hole and a slot opening positioning perpendicularly to each other. The pill dispenser further includes a stick member having sticks with spring members. Further, the pill dispenser further includes a drawer having stick receivers, a rack, and a drawer channel.

In the present invention, the base receives the stick member. The pole receivers receive the poles and connect the base to the funnel. Further, the base receives the drawer through the slot opening. Additionally, the stick receivers receive the sticks.

In operation, the container stores pills and the grooves receive the pills. The pinion rotates causing the stirrer to stir the pills at the grooves such that a single pill falls through the tunnel channel. Here, the tunnel channel aligns with the drawer channel and positions the pill in the drawer channel. The drawer pushes causing the drawer channel to align with the pill discharging hole to discharge the pill via the pill discharging hole. Further, the drawer is released such that the drawer channel aligns with the tunnel channel while the pinion rotates to stir a subsequent pill to fall into the tunnel channel.

In one advantageous feature of the present invention, the stirrer ensures only one pill is drawn from the funnel and the pill made to fall down the tunnel channel and into the drawer channel.

In another advantageous feature of the present invention, the drawer is designed to align with the tunnel to collect the pill, and when pushed, the drawer moves to align with the pill discharging hole to dispense the pill through the pill discharging hole.

In another advantageous feature of the present invention, the pill dispenser dispenses pills individually with a single motion i.e., pressing the drawer into the base. Further, the pill dispenser protects the pills that are stored within the container from contamination.

In yet another advantageous feature of the present invention, the rack and pinion allow the pill dispenser to stir the pills and collect one single pill at a time and make it fall in the tunnel channel. This allows for repeated loading of pills to be dispensed one by one whenever the drawer is pushed/actuated.

The features and advantages of the invention here will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

BRIEF DESCRIPTION OF THE DRAWINGS

The present invention will now be described in detail with reference to the drawings, which are provided as illustrative examples of the invention so as to enable those skilled in the art to practice the invention. Notably, the FIGURES and examples are not meant to limit the scope of the present invention to a single embodiment, but other embodiments are possible by way of interchange of some or all of the described or illustrated elements and, further, wherein.

DETAILED DESCRIPTION

Figure 1:
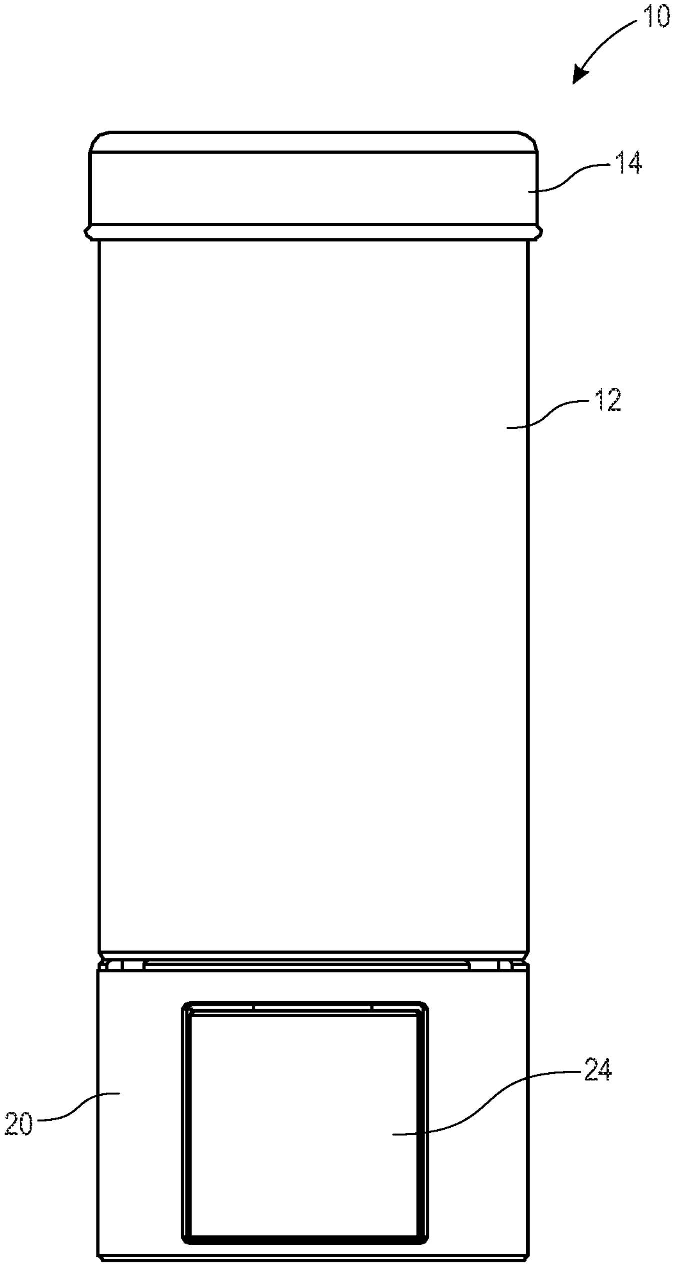
FIGS. 1 and 2 illustrate a front view and an exploded view, respectively of a pill dispenser, in accordance with one embodiment of the present invention.

The following detailed description set forth below in connection with the appended drawings is intended as a description of exemplary embodiments in which the presently disclosed invention may be practiced. The term “exemplary” used throughout this description means “serving as an example, instance, or illustration,” and should not necessarily be construed as preferred or advantageous over other embodiments. The detailed description includes specific details for providing a thorough understanding of the presently disclosed pill dispenser. However, it will be apparent to those skilled in the art that the presently disclosed invention may be practiced without these specific details. In some instances, well-known structures and devices are shown in functional or conceptual diagram form in order to avoid obscuring the concepts of the presently disclosed pill dispenser.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of a pill dispenser, it is to be further understood that numerous changes may arise in the details of the embodiments of the pill dispenser. It is contemplated that all such changes and additional embodiments are within the spirit and true scope of this disclosure.

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure.

The present invention discloses a pill dispenser for storing and dispensing pills. The pill dispenser includes a container and a funnel inserted in the container. The pill dispenser includes a tunnel having a tunnel channel. The tunnel inserts in the funnel. The pill dispenser includes a base connecting the funnel. The base has a pill discharging hole and a slot opening. The pill dispenser includes a stick member, and a drawer having a drawer channel. The base receives the drawer through the slot opening, and the drawer connects to the stick member. The container stores pills and the funnel receives the pills. The tunnel rotates to stir the pills such that a pill falls through the tunnel channel. The tunnel channel aligns with the drawer channel and positions the pill in the drawer channel. The drawer presses into the base causing the drawer channel to align with the pill discharging hole to discharge the pill via the pill discharging hole.

Various features and embodiments of a pill dispenser for storing and dispensing pills are explained in conjunction with the description of FIGS. 1-23.

Figure 2:
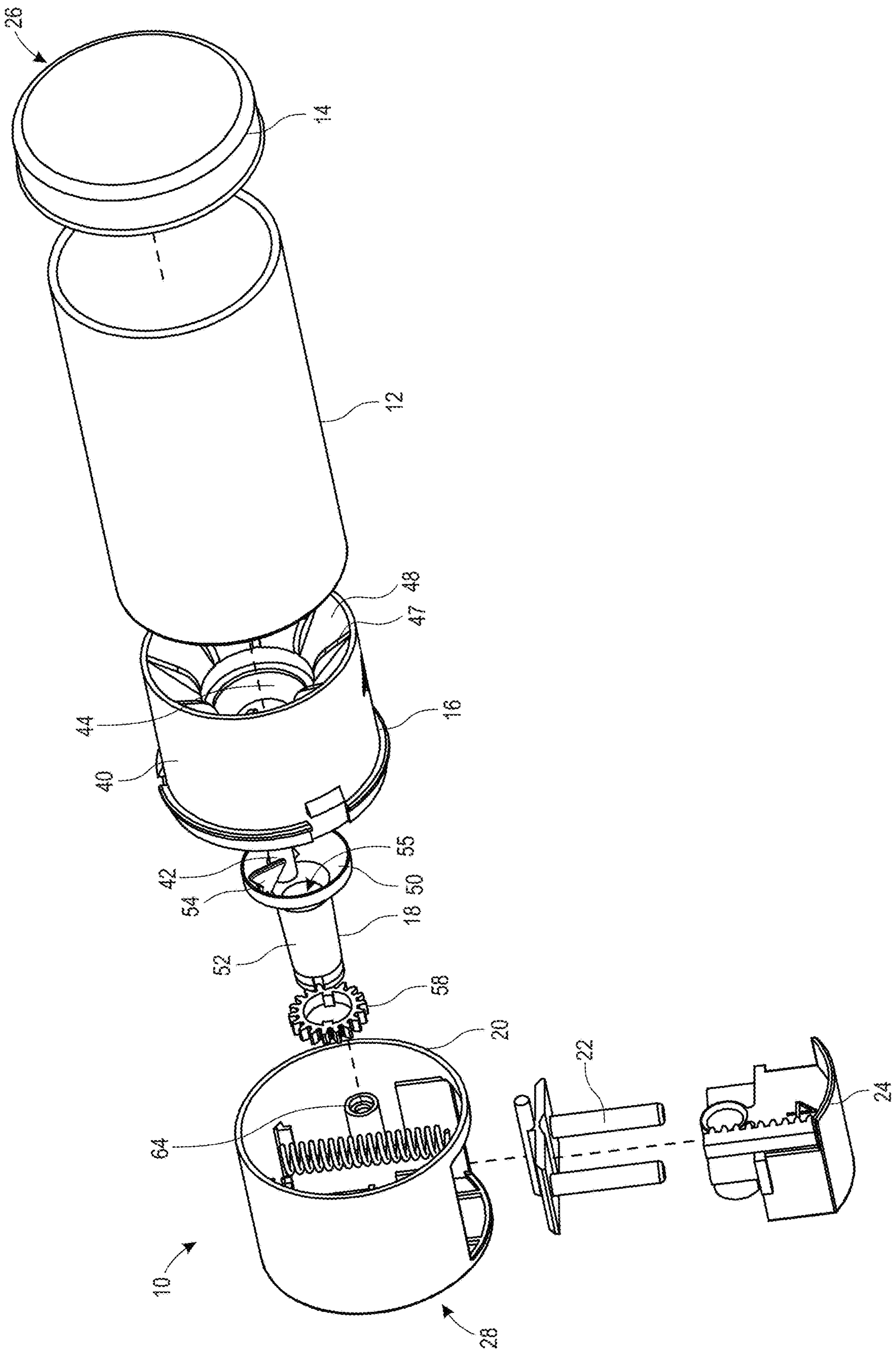

FIGS. 1 and 2 show a front view and an exploded view, respectively of a pill dispenser 10, in accordance with one embodiment of the present invention. Pill dispenser 10 is also referred to as a tablet dispenser or pill tin. Pill dispenser 10 includes a container or housing or tin or pill storage compartment 12, a cap 14, a funnel 16, a tunnel 18, a base 20, a stick member 22 and a drawer 24, as shown in FIG. 2. Here, cap 14 positions at a first end 26 and base 20 positions at a second end 28. First end 26 indicates a top end, and second end indicates a bottom end, or vice versa. Each of container 12, cap 14, funnel 16, tunnel 18, base 20, stick member 22 and drawer 24 is made of a suitable material such as hard plastic, or any other material.

Figure 3:
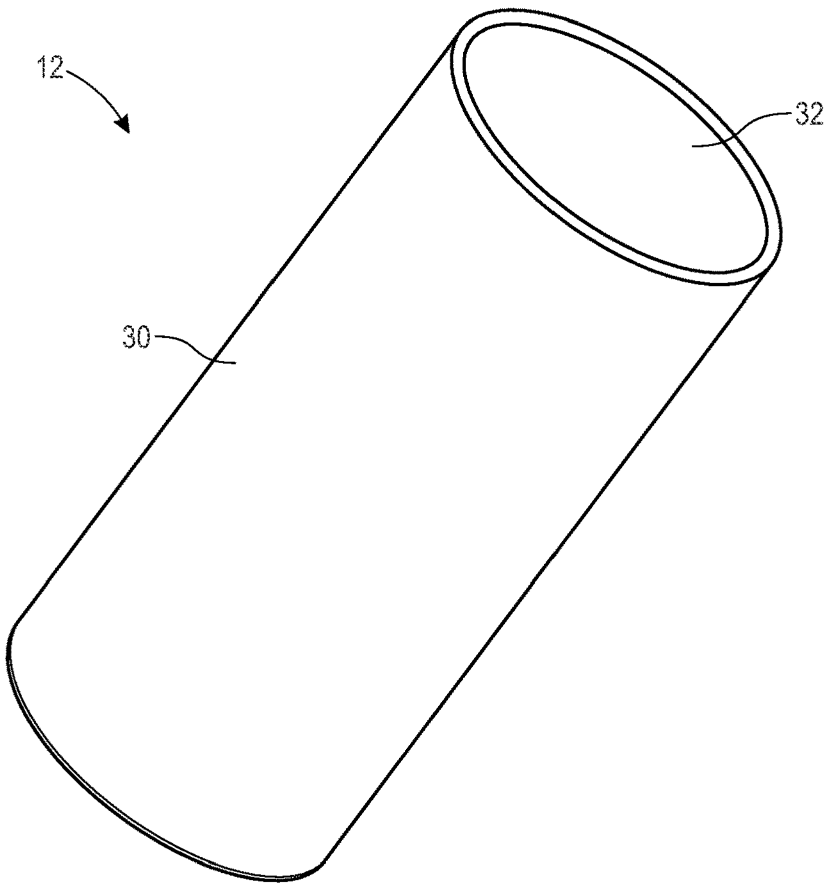
FIG. 3 illustrates a perspective view of a container, in accordance with one embodiment of the present invention.
Figure 4:
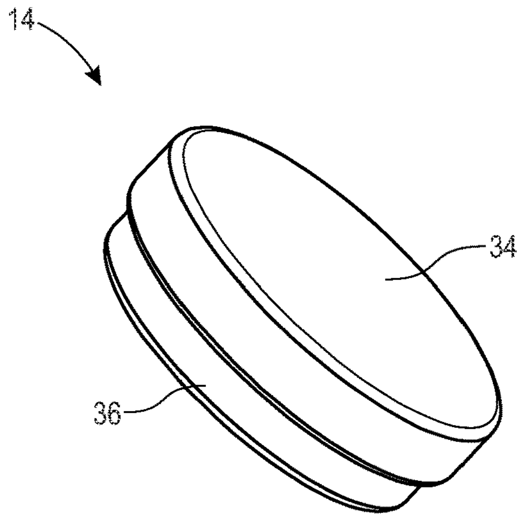
FIG. 4 illustrates a perspective view of a cap, in accordance with one embodiment of the present invention.

FIG. 3 shows a perspective view of container 12, in accordance with one embodiment of the present invention. Container 12 includes a cylindrical member 30 having a storage area 32. Cylindrical member 30 has a suitable height and diameter for providing required storage area 32 for storing pills 90. FIG. 4 shows a perspective view of cap 14, in accordance with one embodiment of the present invention. Cap 14 presents a head member 34 and a neck 36. Head member 34 forms a closure when cap 14 is positioned above container 12, as shown in FIG. 1, for example. Neck 36 receives the top of container 12 forming a tight enclosure with container 12.

Figure 5A:
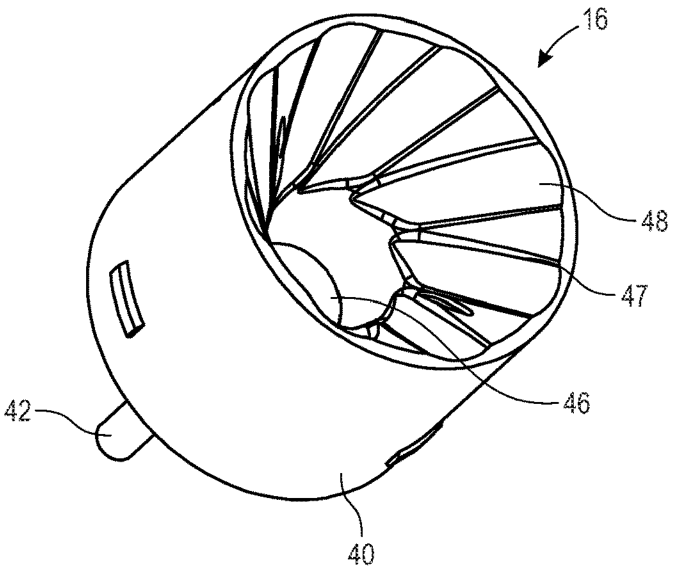
FIGS. 5A, 5B, 5C and 5D illustrate a perspective view, a side view, a top view and a bottom view, respectively of a funnel, in accordance with one embodiment of the present invention.
Figure 5B:
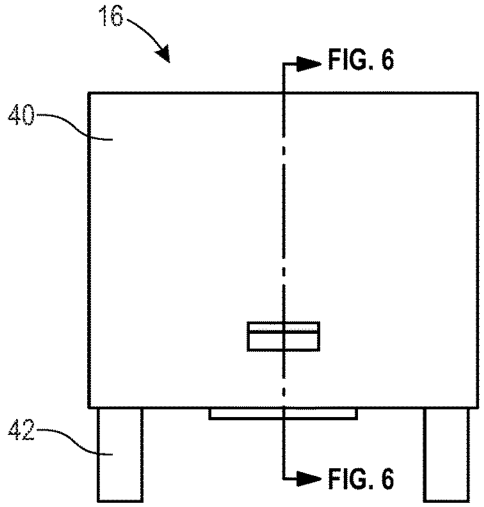
Figure 6:
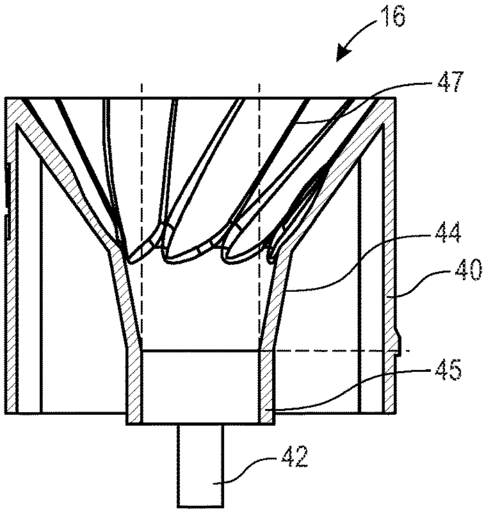
FIG. 6 illustrates a cross-sectional view of FIG. 5B.
Figure 5C:
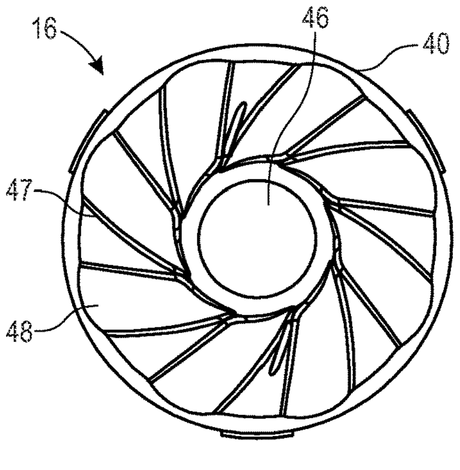
Figure 5D:
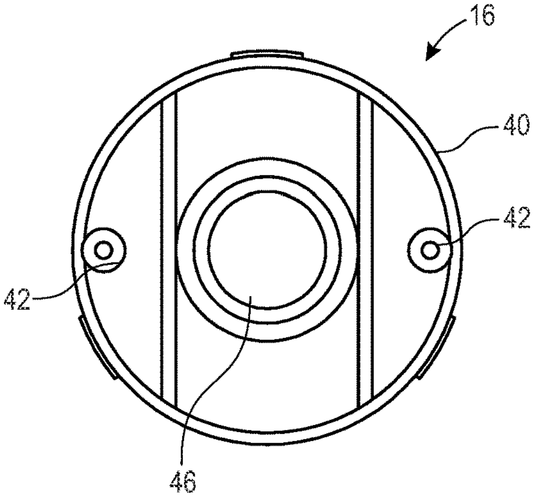
Figure 18:
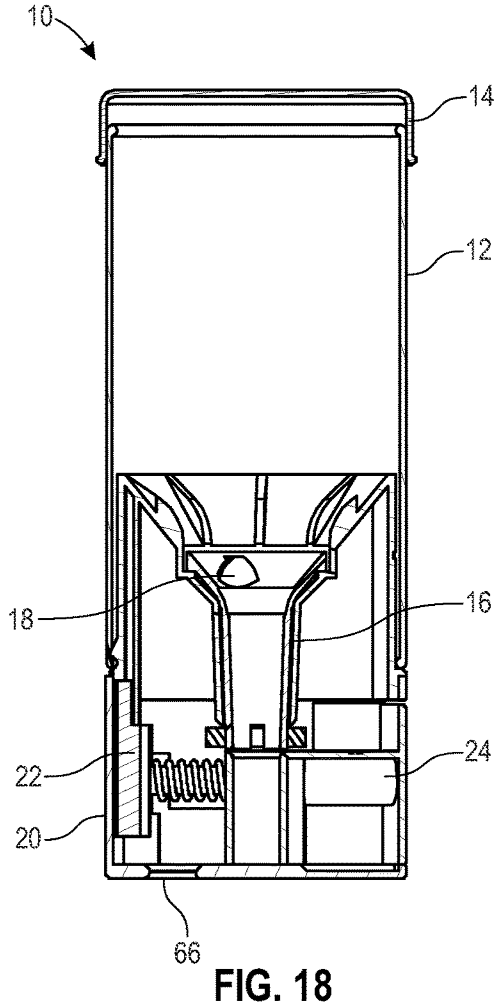

FIGS. 5A, 5B, 5C and 5D show a perspective view, a side view, a top view and a bottom view, respectively of funnel 16, in accordance with one embodiment of the present invention. Funnel 16 includes a cylindrical part 40. Here, cylindrical part 40 has a slightly smaller diameter than cylindrical member 30 such that cylindrical part 40 is able to sit within the cylindrical member 30, as shown in FIG. 18, for example. Cylindrical part 40 includes a pair of poles 42 extending from the bottom, as shown in at least FIGS. 5B and 5D. Further, cylindrical part 40 includes a first tapered portion 44 and an elongated section 45. FIG. 6 shows a cross-sectional view of FIG. 5B presenting first tapered portion 44 and elongated section 45. Here, first tapered portion 44 takes up approximately the top half of cylindrical part 40 and elongated section 45 extends downward of first tapered portion 44 forming a first channel or funnel channel 46, as shown in FIG. 5A. In the present invention, first tapered portion 44 includes a plurality of ribs 47 forming grooves 48, as shown in at least FIGS. 5A and 5C.

Figure 7A:
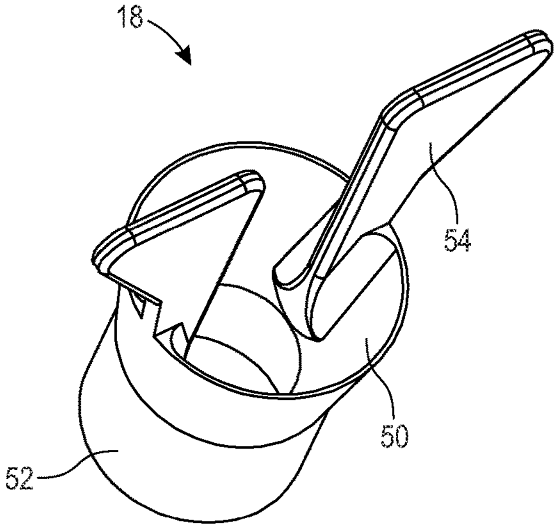
FIGS. 7A, 7B, and 7C illustrate a perspective view, a top view and a side view, respectively of a tunnel, in accordance with one embodiment of the present invention.
Figure 7B:
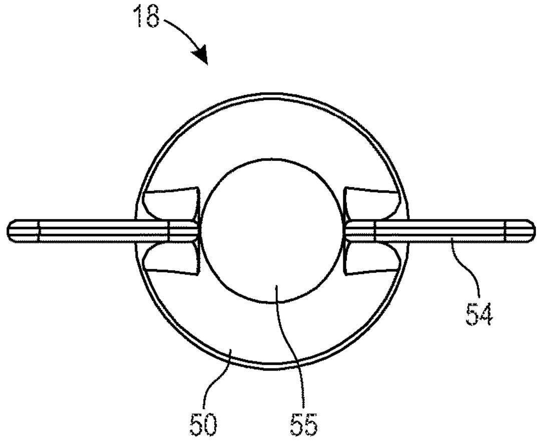
Figure 7C:
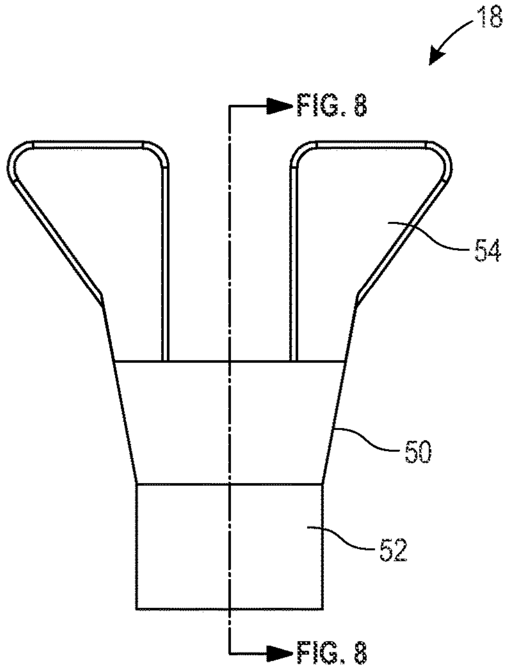
Figure 8:
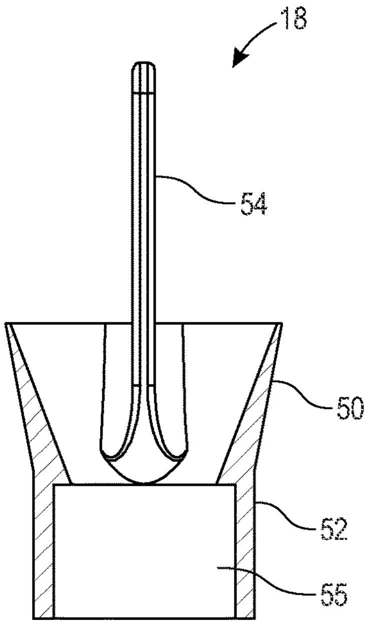
FIG. 8 illustrates a cross-sectional view of FIG. 7C.

FIGS. 7A, 7B, and 7C show a perspective view, a top view and a side view, respectively of tunnel 18, in accordance with one embodiment of the present invention. Further, FIG. 8 shows a cross-sectional view of tunnel 18 shown in FIG. 7C. Tunnel 18 includes a tapered section 50, and an elongated section 52 extending downward from tapered section 50. At the top, tunnel 18 includes fins 54 extending from tapered section 50. In one example, fins 54 extend upward and outward from tapered section 50 and sit in grooves 48 formed at funnel 16, as shown in at least FIG. 18. In the present invention, elongated section 52 forms a second channel or tunnel channel 55. Tunnel channel 55 has a slightly smaller diameter than funnel channel 46 such that tunnel 18 sits within funnel 16, as shown in at least FIG. 18.

Figure 9:
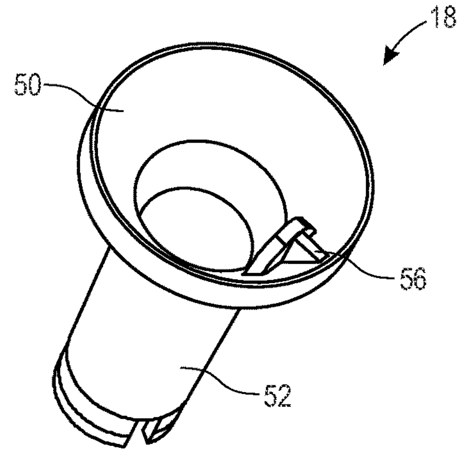
FIG. 9 illustrates a partial view of the tunnel, in accordance with one embodiment of the present invention.
Figure 10:
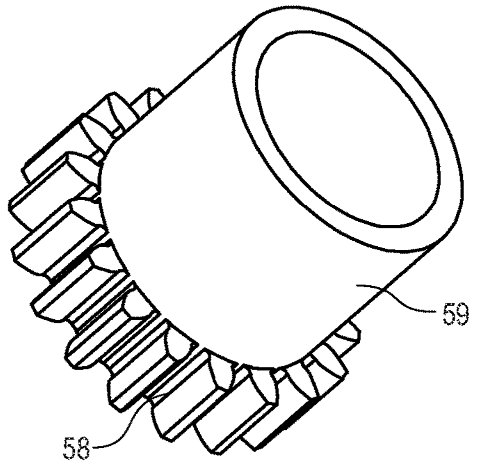
FIG. 10 illustrates a pinion that connects to the tunnel, in accordance with one embodiment of the present invention.

In one embodiment, fins 54 connect at tapered section 50 with the help of connector or stirrer 56, as shown in FIG. 9. Optionally, tunnel 18 includes only stirrer 56 to stir pills 90 in funnel 16. Further, tunnel 18 includes a pinion 58, as shown in FIG. 10. Here, pinion 58 connects to tunnel 18 via a connecting member 59 that mounts to elongated section 52.

Figure 11A:
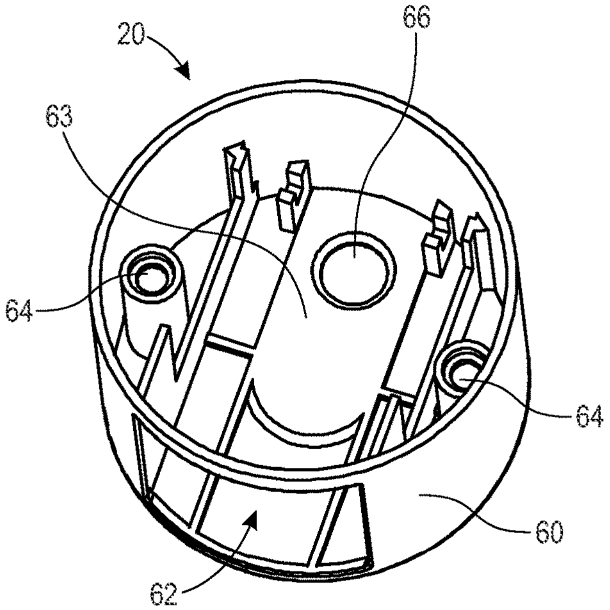
FIGS. 11A and 11B illustrate a top perspective view and a top view, respectively of a base, in accordance with one embodiment of the present invention.
Figure 11B:
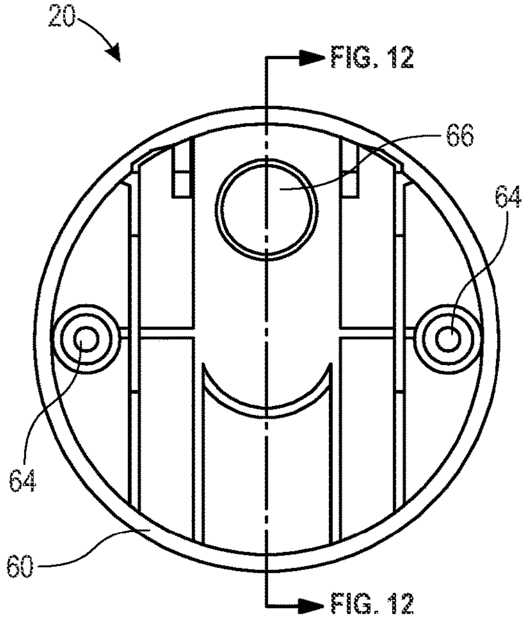
Figure 12:
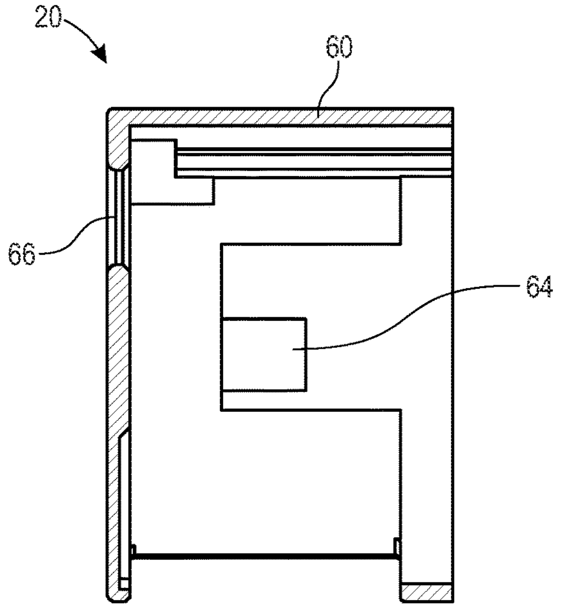
FIG. 12 illustrates a cross-sectional view of FIG. 11B.

FIGS. 11A and 11B show a top perspective view and a top view, respectively of base 20, in accordance with one embodiment of the present invention. Further, FIG. 12 shows a cross-sectional view of base 20 shown in FIG. 11B. Base 20 includes a cylindrical part or cylindrical wall 60 having a slot opening 62 at one side, as shown in FIG. 11A. Cylindrical part 60 has a bottom portion 63. As can be seen, cylindrical part 60 extends perpendicularly to bottom portion 63. In one embodiment, base 20 presents pole receivers 64. Pole receivers 64 extend from bottom portion 63 and receive poles 42 and help to connect funnel 16 to base 20, as shown in FIG. 18. Further, bottom portion 63 has a pill discharging hole 66. Pill discharging hole 66 is formed by chipping off a portion of bottom portion 63 in a circular or any other configuration depending on the need. Pill discharging hole 66 positions perpendicularly to slot opening 62.

Figure 13:
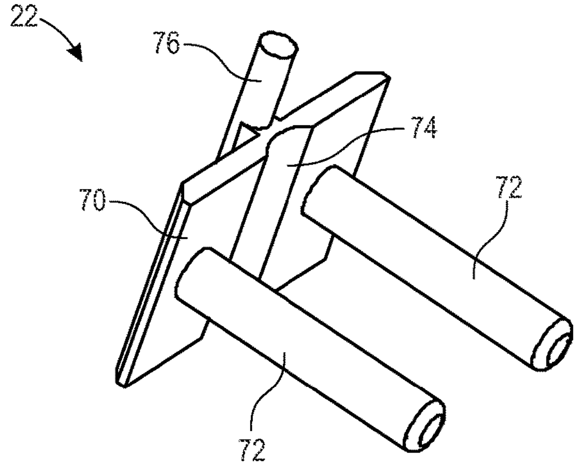
FIG. 13 illustrates a perspective view of a stick member, in accordance with one embodiment of the present invention.
Figure 14:
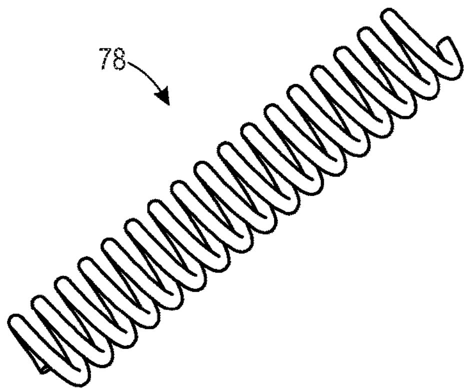
FIG. 14 illustrates a perspective view of a spring member, in accordance with one embodiment of the present invention.

FIG. 13 shows a perspective view of stick member 22, in accordance with one embodiment of the present invention. Stick member 22 includes a support structure 70. Further, stick member 22 includes sticks 74 extending from support structure 70. In one example, support structure 70 has a recess section 74. Further, support structure 70 includes an extending pole 76. In accordance with one embodiment, sticks 72 configure to receive spring members 78. FIG. 14 shows a perspective view of spring member 78.

Figure 15A:
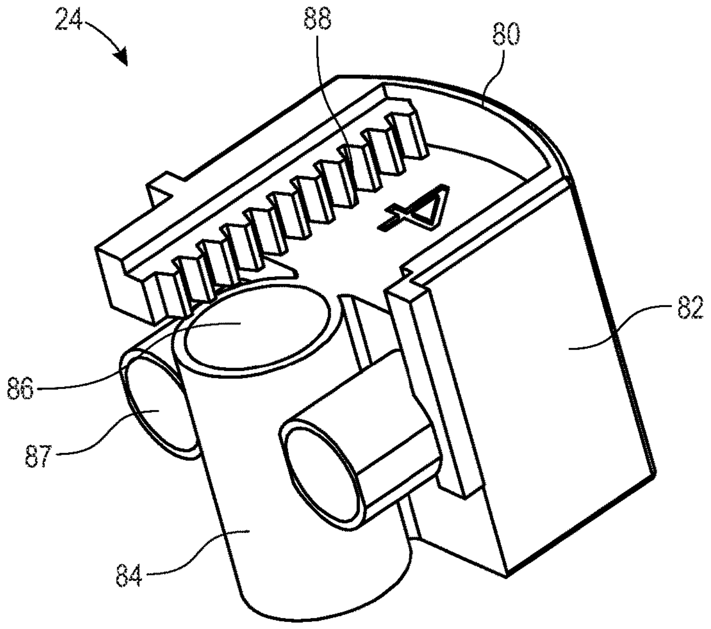
FIGS. 15A and 15B illustrate a perspective view and a top view, respectively of a drawer, in accordance with one embodiment of the present invention.
Figure 15B:
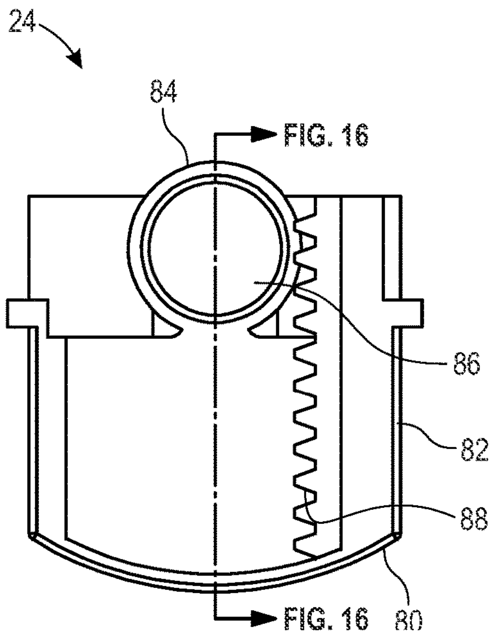
Figure 16:
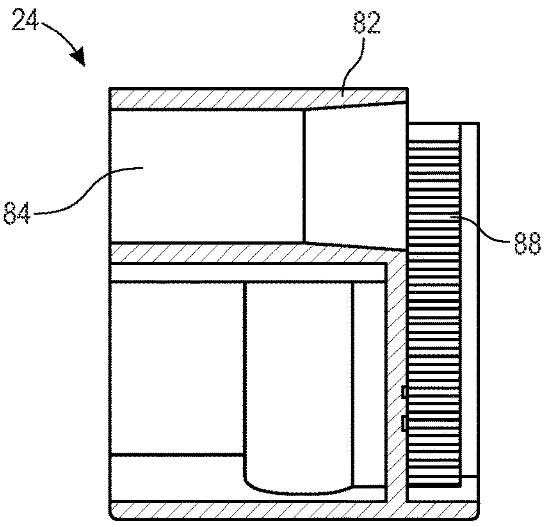
FIG. 16 illustrates a cross-sectional view of FIG. 15B.

FIGS. 15A and 15B show a perspective view and a top view, respectively of drawer 24, in accordance with one embodiment of the present invention. Further, FIG. 16 shows a cross-sectional view of FIG. 15B. Drawer 24 includes a curved section 80 that inserts through slot opening 62 of base 20 and completes the cylindrical wall 60, as shown in FIG. 1. Further, drawer 24 has an extended section 82. Extended section 82 extends from the distal ends of curved section 80, as can be seen from FIG. 15B. Drawer 24 includes a tubular part 84 having a drawer channel 86. Further, drawer 24 includes stick receivers 87 configured to receive sticks 74 having spring members 78. In one example, drawer 24 includes a rack 88 mounting perpendicularly to tubular part 84.

Figure 17:
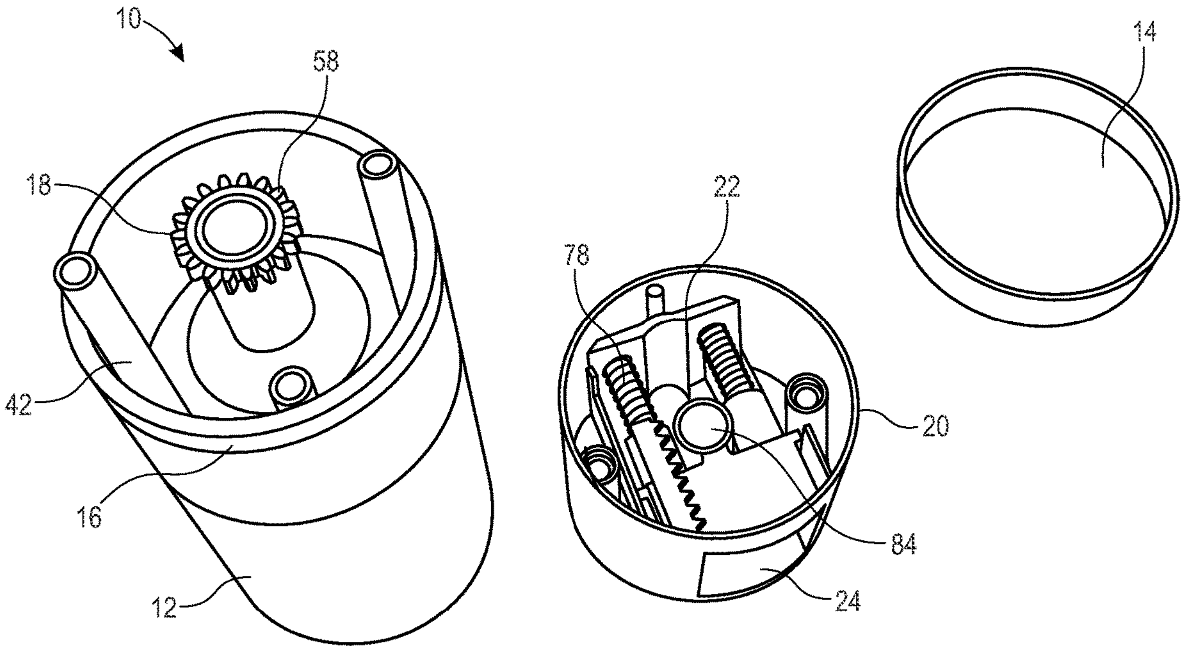
FIGS. 17 and 18 illustrate a partial assembled view, and a complete assembled view, respectively of the pill dispenser, in accordance with one embodiment of the present invention.

FIG. 17 shows a partially assembled view of pill dispenser 10 showing container 12, base 20 and cap 14 prior to their assembly. Here, container 12 receives funnel 16 having tunnel 18 therein. Further, base 20 receives stick member 22 and drawer 24. FIG. 18 shows the assembled pill dispenser 10, in accordance with one embodiment of the present invention. In order to assemble pill dispenser 10, at first, stick member 22 is inserted in base 20. Here, spring members 78 are placed around sticks 74, as shown in FIG. 17. Further, drawer 24 is drawn through slot opening 62 of base 20 such that stick receivers 87 face sticks 74. Subsequently, sticks 74 are inserted in stick receivers 87, as shown in FIG. 17.

Concurrently or consecutively, funnel 16 is placed inside container 12. Further, tunnel 18 is placed inside funnel 16 such that elongated section 52 is extended beyond to connect pinion 58. After placing tunnel 18 and funnel 16 inside container 12, poles 42 are inserted in pole receivers 64 to connect funnel 16 to base 20. In other words, container 12 having funnel 16 and tunnel 18 are installed above base 20 having stick member 22 and drawer 24. Subsequently, cap 14 is installed at the top of container 12, as shown in FIG. 18.

Figure 19:
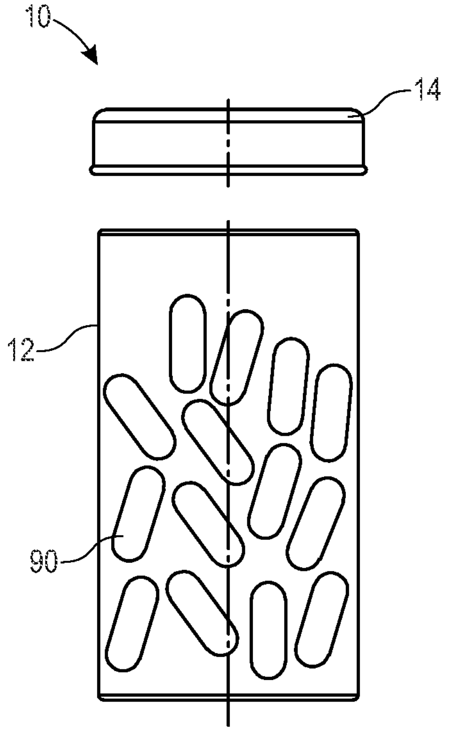
FIGS. 19 through 23 illustrate the operation of the pill dispenser, in accordance with one embodiment of the present invention.
Figure 20:
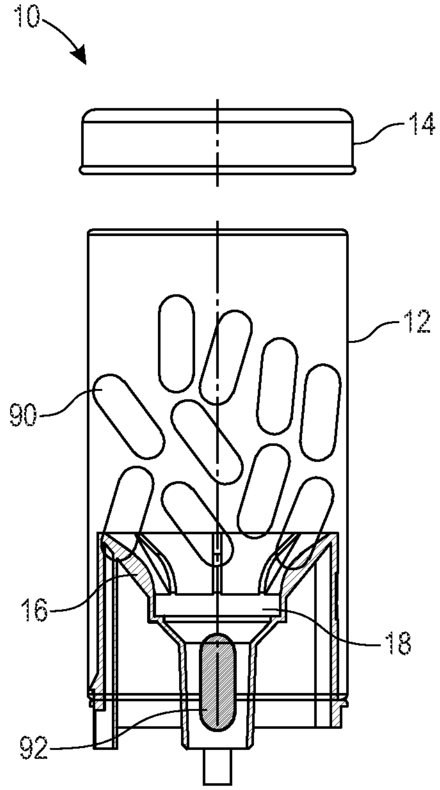
Figure 21:
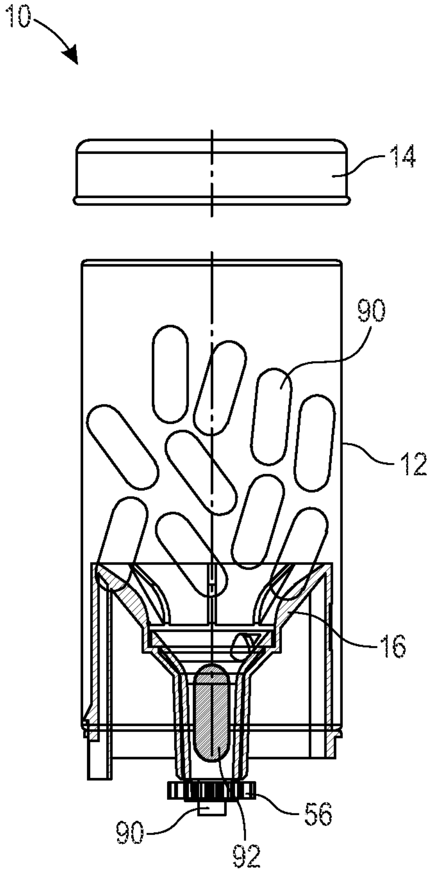
Figure 22:
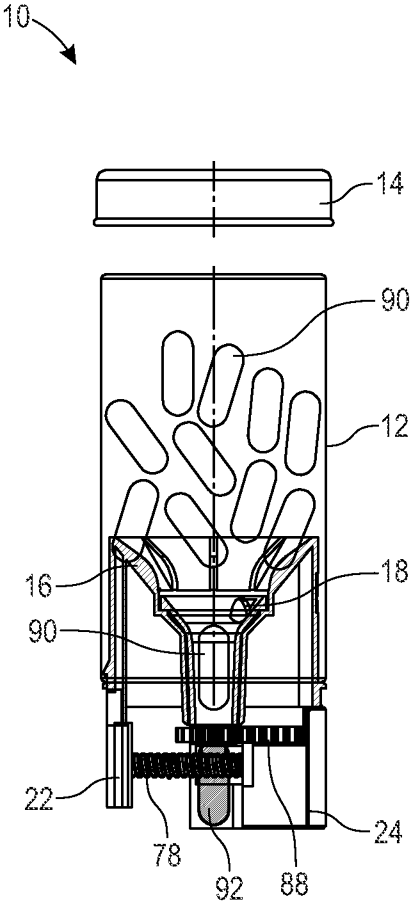

Now referring to FIGS. 19 through 23, the operation of pill dispenser 10 is explained. At first, container 12 stores a plurality of pills 90 as shown in FIG. 19. Due to gravity, pills 90 fall into funnel 16, as shown in FIG. 20. As specified above, funnel 16 includes grooves 48. Grooves 48 separate pills 90. Further, fins 54 stir pills 90 such that only one pill gets through funnel channel 46 or tunnel channel 55. For ease of reference, pills 90 stored in container 12 and positioned in funnel 16 are referred as pills 90, and one pill that is about to get discharged from pill dispenser 10 is referred to as a discharging pill 92. In order to stir pills 90, tunnel 18 is rotated by the actuation of pinion 56. Here, fins 54 stir pills 90 such that only one discharging pill 92 falls into tunnel channel 55, as shown in FIG. 21. In other words, tunnel 18 gets driven by pinion 56 to stir pills 90. This ensures only one discharging pill 92 falls into tunnel channel 55 and prevents pills 90 from getting jammed. The constructional features of tunnel 18 and drawer 24 ensure that tunnel channel 55 gets aligned with drawer channel 86. As such, when discharging pill 92 falls down from tunnel channel 55, discharging pill 92 is collected in drawer channel 86, as shown in FIG. 22. When discharging pill 92 positions in drawer channel 86, succeeding pill 90 comes to tunnel channel 55, as shown in FIG. 22. A person skilled in the art understands that pill discharging hole 66 is offset to funnel channel 46, tunnel channel 55 and drawer channel 86 until this point.

Figure 23:
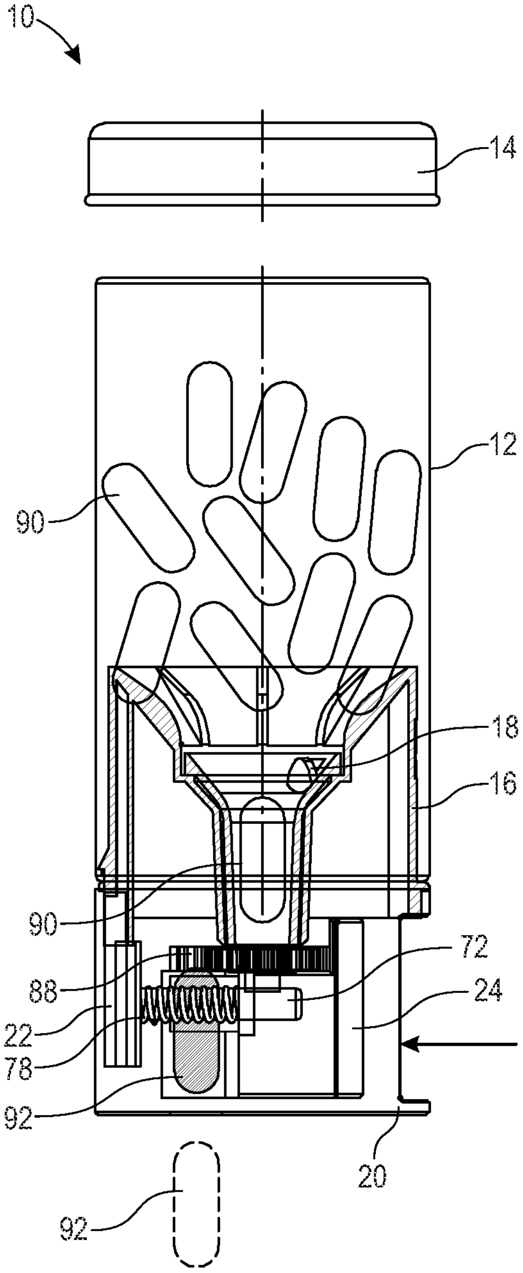

Further, the user presses drawer 24, as shown in FIG. 23. Pressing drawer 24 into base 20 pushes drawer 24 inside base 20 while moving forward. Here, rack 88 drives pinion 56 and helps drawer 24 to move forward with the help of spring members 78. Moving drawer 24 forward brings drawer channel 86 in alignment with pill discharging hole 66. Once drawer channel 86 aligns with pill discharging hole 66, discharging pill 92 exits pill dispenser 10 i.e., base 20 and drawer 24, as shown in FIG. 23. In other words, pushing drawer 24 allows to drop out discharging pill 92 through pill discharging hole 66.

After dispensing discharging pill 92, drawer 24 is released. Here, spring members 78 push back drawer 24 to its original position e.g., to the position as shown in FIG. 22. Subsequently, pills 90 are stirred to bring discharging pill 92 into tunnel channel 55 and then into drawer channel 86, as explained above.

The presently disclosed pill dispenser provides several advantages over the prior art. The pill dispenser provides a unique mechanism to dispense one pill at a time. The pill dispenser has a funnel having grooves to separate the pills. The funnel receives a tunnel that helps to stir the pills and move one pill into a channel positioned below for the pill to fall into. Further, the base is designed to have an offset pill discharging hole with respect to the funnel channel, and tunnel channel. The pill dispenser presents a drawer having a drawer channel that is aligned with the tunnel channel. When the drawer is pressed, the drawer channel is configured to move and align with the pill discharging hole to discharge the pill through the pill discharging hole. After discharging the pill, the drawer is released to allow another pill to fall into the tunnel channel and to repeat the above cycle.

A person skilled in the art appreciates that the railroad safety system can come in a variety of shapes and sizes depending on the need and comfort of the user. Further, many changes in the design and placement of components may take place without deviating from the scope of the presently disclosed pill dispenser.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A pill dispenser, comprising:

a container;

a cap covering the top of said container;

a funnel comprising a funnel channel, wherein said funnel inserts in said container;

a tunnel comprising a tunnel channel and a tapered section, wherein said tunnel inserts in said funnel, wherein said tunnel channel aligns with said funnel channel, and wherein said tapered section comprises fins extending upward and outward from said tapered section;

a base comprising a pill discharging hole and a slot opening, wherein said slot opening positions perpendicularly to said pill discharging hole;

a stick member; and a drawer comprising a drawer channel, wherein said base receives said stick member, wherein said base connects to said funnel, wherein said base receives said drawer through said slot opening, and wherein said drawer connects to said stick member inside said base, wherein said container stores pills, wherein said funnel receives said pills from said container, wherein said tunnel rotates to stir said pills such that a pill of said pills falls through said tunnel channel, wherein said tunnel channel aligns with said drawer channel such that said pill falls into said drawer channel, wherein said drawer presses into said base causing said drawer channel to align with said pill discharging hole to discharge said pill via said pill discharging hole, and wherein said drawer is released such that said drawer channel aligns with said tunnel channel while said tunnel rotates to stir a subsequent pill from said pills to fall into said tunnel channel.

2. The pill dispenser of claim 1, wherein said container comprises a cylindrical member having a storage area for storing said pills.

3. The pill dispenser of claim 1, wherein said funnel comprises a tapered portion and an elongated section, wherein said tapered section comprises ribs forming grooves therebetween, and wherein said grooves receive said pills.

4. The pill dispenser of claim 3, wherein said fins position at said grooves when said tunnel sits within said funnel, and wherein said fins stir said pills such that said pill falls down via said tunnel channel.

5. The pill dispenser of claim 1, wherein said funnel comprises poles extending downward, wherein said base comprises pole receivers facing said funnel, and wherein said pole receivers receive said poles and connect said base to said funnel.

6. The pill dispenser of claim 1, wherein said tunnel comprises a pinion, wherein said drawer comprises a rack, wherein said pinion rotates and moves along said rack causing said drawer to move forward when said drawer is pressed to dispense said pill.

7. The pill dispenser of claim 6, wherein said pinion rotates causing said tunnel to rotate and stir said pills and make said pill to fall through said tunnel channel.

8. The pill dispenser of claim 6, wherein said drawer is released causing said pinion to rotate backwards and stir said pills in said funnel in order to allow single pill to fall down into said tunnel channel and said drawer channel.

9. The pill dispenser of claim 1, wherein said stick member comprises sticks extending towards said drawer, and wherein said sticks comprises spring members.

10. The pill dispenser of claim 9, wherein said drawer comprises stick receivers, and wherein said stick receivers receive said sticks.

11. A method of providing a pill dispenser, said method comprising the steps of:

providing a container;

providing a cap for covering the top of said container;

providing a funnel comprising a funnel channel;

inserting said funnel in said container;

providing a tunnel comprising a tunnel channel and a tapered section, said tapered section comprising fins extending upward and outward from said tapered section;

inserting said tunnel in said funnel;

aligning said tunnel channel with said funnel channel;

providing a base, said base connecting said funnel, said base comprising a pill discharging hole and a slot opening, said slot opening positioning perpendicularly to said pill discharging hole;

providing a stick member;

providing a drawer comprising a drawer channel;

inserting said stick member in said base;

connecting said base to said funnel;

drawing said drawer through said slot opening and connecting to said stick member;

storing pills in said container;

receiving said pills at said funnel;

causing said tunnel to rotate for stirring said pills in said funnel such that a pill of said pills falls through said tunnel channel;

aligning said tunnel channel with said drawer channel for positioning said pill in said drawer channel;

pressing said drawer for aligning said drawer channel with said pill discharging hole for discharging said pill via said pill discharging hole; and releasing said drawer such that said drawer channel aligns with said tunnel channel while said tunnel rotates to stir a subsequent pill from said pills to fall into said tunnel channel.

12. The method of claim 11, further comprising:

providing a tapered portion and an elongated section at said funnel;

providing ribs at said tapered portion for forming grooves therebetween; and receiving said pills at said grooves.

13. The method of claim 12, further comprising positioning said fins at said grooves, and said fins causing said pills to stir such that said pill falls down said tunnel channel.

14. The method of claim 11, further comprising:

providing poles extending downward from said funnel;

providing pole receivers at said base facing said funnel; and receiving said poles at said pole receivers for connecting said base to said funnel.

15. The method of claim 11, further comprising:

providing a pinion at said tunnel;

providing a rack at said drawer;

rotating said pinion to move along said rack causing said drawer to move forward when said drawer is pressed to dispense said pill.

16. The method of claim 15, further comprising causing said pinion to rotate for rotating said tunnel in order to stir said pills and make said pill to fall through said tunnel channel.

17. The method of claim 15, further comprising releasing said drawer causing said pinion to rotate backwards and stir said pills in said funnel in order to allow single pill to fall down into said tunnel channel and said drawer channel.

18. The method of claim 11, further comprising providing sticks having spring members at said stick member.

19. The method of claim 18, further comprising providing stick receivers at said drawer, said stick receivers receiving said sticks.

20. A pill dispenser, comprising:

a container;

a cap covering the top of said container;

a funnel, wherein said funnel inserts in said container, wherein said funnel comprises poles extending downward, wherein said funnel comprises a tapered portion having ribs forming grooves therebetween, and wherein said funnel comprises a funnel channel;

a tunnel, wherein said tunnel inserts in said funnel, wherein said tunnel comprises a tunnel channel and a tapered section, wherein said tunnel channel aligns with said funnel channel, wherein said tunnel comprises a pinion, wherein said tunnel comprises a stirrer positioning at said grooves, and wherein said tapered section comprises fins extending upward and outward from said tapered section;

a base, wherein said base comprises pole receivers, wherein said base comprises a pill discharging hole, and a slot opening, and wherein said slot opening positions perpendicularly to said pill discharging hole;

a stick member comprising sticks, wherein said sticks comprise spring members; and a drawer comprising stick receivers, a rack, and a drawer channel, wherein said base receives said stick member, wherein said pole receivers receive said poles and connect said base to said funnel, wherein said base receives said drawer through said slot opening, wherein said stick receivers receive said sticks, wherein said container stores pills, wherein said grooves receive said pills, wherein said pinion turns causing said stirrer to stir said pills at said grooves such that a pill of said pills falls through said tunnel channel, and wherein said tunnel channel aligns with said drawer channel and positions said pill in said drawer channel, wherein said drawer presses into said base causing said drawer channel to align with said pill discharging hole to discharge said pill via said pill discharging hole, and wherein said drawer is released such that said drawer channel aligns with said tunnel channel while said pinion rotates to stir a subsequent pill from said pills to fall into said tunnel channel.

* * * * *